C. D. CONKLIN.
INCUBATOR FRAME.
APPLICATION FILED AUG. 10, 1917.
1,270,700. Patented June 25, 1918.
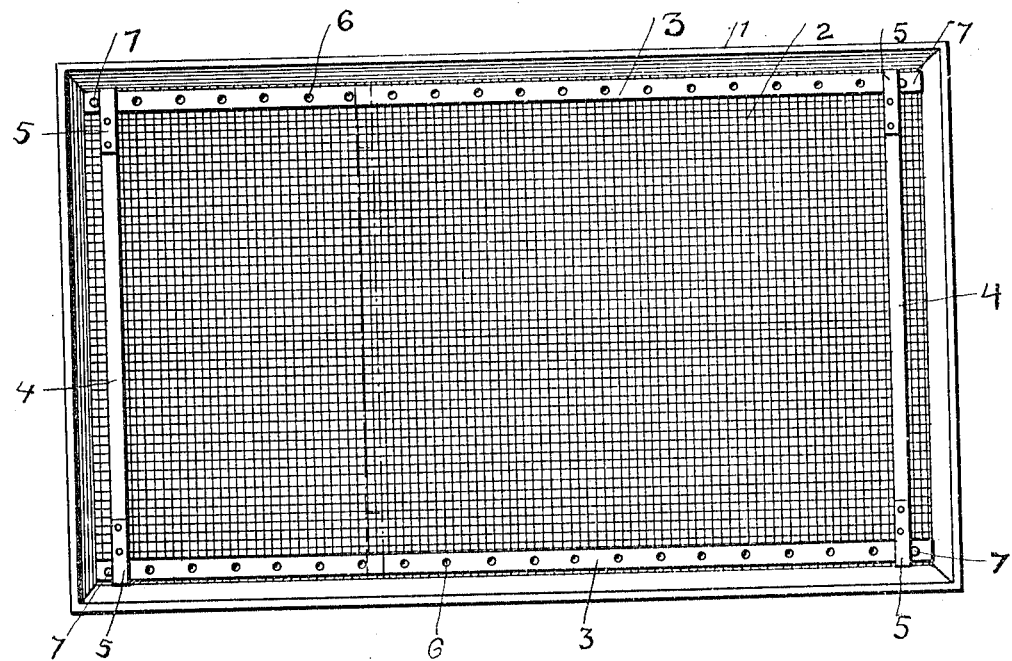
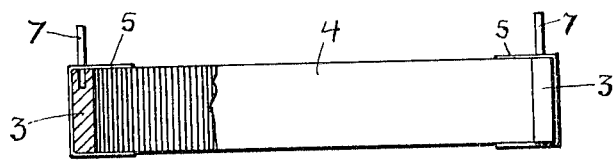
WITNESSES
INVENTOR
Charles D. Conklin
BY
ATTORNEY

UNITED STATES PATENT OFFICE.

CHARLES D. CONKLIN, OF JUDSON, MINNESOTA.

INCUBATOR-FRAME.

1,270,700.  Specification of Letters Patent.  Patented June 25, 1918.

Application filed August 10, 1917. Serial No. 185,600.

*To all whom it may concern:*

Be it known that I, CHARLES D. CONKLIN, a citizen of the United States, residing at Judson, in the county of Blue Earth and State of Minnesota, have invented certain new and useful Improvements in Incubator-Frames, of which the following is a specification.

This invention relates to new and useful improvements in incubators and the principal object of the invention is to provide means for preventing movement of the eggs in the egg tray.

Another object of the invention is to provide adjustable means for crowding the eggs together on the tray so the same cannot roll about on the tray when the said tray is not completely filled with eggs.

A further object of the invention is to provide a box like frame having two of its end pieces movably mounted on the side pieces with means for holding the end pieces at any desired position on said side pieces.

A still further object of the invention is to keep the eggs together with the side through which the chick has started to pick uppermost.

Another object of the invention is to provide a device of this character, which is simple and durable in construction, reliable and efficient in operation and one which can be manufactured and placed upon the market at a minimum cost.

The invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings, wherein like characters denote like or corresponding parts throughout the several views, and in which:—

Figure 1 is a top view of an egg tray of an incubator with my invention in place thereon, and Fig. 2 is an end view with part in section.

As it is well known in the art of incubation the eggs are tested as to their fertility after they have been in the incubator a certain number of days and at this time all unfertile eggs are removed from the tray. This leaves the tray only partly filled so that the remaining eggs will roll about when the tray is handled. It is also well known that when the chick starts to break through the shell if he should happen to pick through the lower side and come in contact with the wire bottom of the tray he will be unable to get out of the shell and will thus die. It is therefore necessary to hold the eggs with the picked side up.

My invention has for its object to provide means to hold the eggs against movement in the tray thus avoiding the eggs rolling about when the tray is handled and also holding the eggs against movement when they are placed in the tray with the picked side up.

My invention is illustrated in the accompanying drawings in which 1 indicates the tray of an incubator having a wire bottom 2. This tray may be of any of the types now in use in incubators as my invention may be easily changed to fit the tray. The invention consists of a box like frame consisting of the side members 3 and the end members 4. The side members are substantially the same as the inside length of the tray while the end members extend from the inside edge of one side member to the inside edge of the other side member and are of such a length as to hold the side members adjacent the sides of the tray. The end members are provided with straps 5, formed of metal or the like, secured to their ends and embracing the side members, so that said end members may slide on the side members, said straps acting as guides for the side members.

Each of the side members is provided with a plurality of holes 6 in its upper face which are spaced apart and extend from end to end of the member. Each member is provided with a pair of pins 7 adapted to be placed in these holes with which the straps on the end members engage to hold said end members at any desired position relative to the side members. It will be understood that the holes in one side member are in alinement with the holes in the other side member.

When some of the eggs are removed from the tray, either one or both of the end members may be moved along the side members to crowd the eggs together on the tray, said end members being held in position by the pins 7 being placed in the proper holes 6. Thus the eggs are held against movement and when the eggs begin to hatch they may be turned with the picked side up and the frame will hold them in this position until the eggs are completely hatched.

It is thought from the foregoing that the advantages and novel features of my invention will be readily apparent.

I desire it to be understood that I may make slight changes in the construction and in the combination and arrangement of the several parts, provided that such changes fall within the scope of the appended claim.

I claim:—

An incubator tray embodying fixed end and side walls, and supplemental walls paralleling the respective fixed walls of the tray, the side supplemental walls having openings in their length in coincident position, straps embracing the side supplemental walls and secured to the end supplemental walls, and pins to hold the end supplemental walls in adjusted position.

In testimony whereof I affix my signature in presence of two witnesses.

CHARLES D. CONKLIN.

Witnesses:
C. D. CONKLIN, Sr.,
WM. P. MASON.

Copies of this patent may be obtained for five cents each, by addressing the "Commissioner of Patents, Washington, D. C."